United States Patent
Parizy et al.

(10) Patent No.: US 11,099,866 B2
(45) Date of Patent: Aug. 24, 2021

(54) APPARATUS AND METHOD TO PROVIDE HELP INFORMATION TO A USER IN A TIMELY MANNER

(71) Applicant: FUJITSU LIMITED, Kawasaki (JP)

(72) Inventors: Matthieu Parizy, Meguro (JP); Tatsuya Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 16/435,938

(22) Filed: Jun. 10, 2019

(65) Prior Publication Data
US 2019/0391842 A1 Dec. 26, 2019

(30) Foreign Application Priority Data
Jun. 20, 2018 (JP) .............................. JP2018-116782

(51) Int. Cl.
| | |
|---|---|
| *G06F 9/451* | (2018.01) |
| *G06F 9/48* | (2006.01) |
| *G06F 11/34* | (2006.01) |
| *G06N 20/00* | (2019.01) |
| *G06F 3/048* | (2013.01) |

(52) U.S. Cl.
CPC .............. *G06F 9/453* (2018.02); *G06F 3/048* (2013.01); *G06F 9/485* (2013.01); *G06F 11/3414* (2013.01); *G06F 11/3433* (2013.01); *G06N 20/00* (2019.01); *G06F 11/3476* (2013.01)

(58) Field of Classification Search
CPC .. G06F 9/485; G06F 11/3414; G06F 11/3433; G06F 11/3476
See application file for complete search history.

(56) References Cited

U.S. PATENT DOCUMENTS

| | | | |
|---|---|---|---|
| 10,885,808 B2 * | 1/2021 | Saunders | ................ H04L 67/22 |
| 2018/0341336 A1 * | 11/2018 | Norrbom | ................ G09B 13/04 |
| 2019/0278619 A1 * | 9/2019 | Gupta | ..................... G09B 7/00 |

FOREIGN PATENT DOCUMENTS

| | | |
|---|---|---|
| JP | 2010-218359 | 9/2010 |
| JP | 2015-158817 | 9/2015 |

\* cited by examiner

*Primary Examiner* — Jacob D Dascomb
(74) *Attorney, Agent, or Firm* — Fujitsu Patent Center

(57) ABSTRACT

An apparatus stores status information and workload information for each task executed by a user. The apparatus detects, based on the status information, completion of a first task, and withholds notification of first help information related to software selected based on a usage state of the software in the first task. The apparatus detects, based on the status information, completion of a second task after completion of the first task, and calculates, based on the workload information, an index value indicating a total workload of completed tasks including the first and second tasks. When the index value is greater than a threshold, the apparatus allows providing the user with notification of the first help information and second help information related to the software selected based on a usage state of the software in the second task; otherwise the apparatus withholds notification of the first and second help information.

6 Claims, 12 Drawing Sheets

FIG. 4

| | | 121 |
|---|---|---|
| TICKET ID | ticket1 | |
| TITLE | ADD FUNCTION A | |
| PERSON IN CHARGE | user1 | |
| EXPLANATION | RECOGNIZE HANDWRITTEN CHARACTERS BY USING software1 AND OUTPUT DATA D | |
| PLANNED MAN-HOURS | 2 DAYS | |
| DEADLINE | 2018-04-02 17:00 | |
| BEGINNING DATE AND TIME | 2018-04-01 09:00 | |
| ENDING DATE AND TIME | 2018-04-02 16:00 | |
| STATUS | closed | |
| COMMENT | ... | |

FIG. 7

| TOPIC ID | TOPIC NAME | KEYWORD | 124 |
|---|---|---|---|
| topic1 | software1 FUNCTION | software1, HANDWRITTEN CHARACTER RECOGNITION, ... | |
| topic2 | software2 FUNCTION | ... | |
| ... | ... | ... | |

FIG. 8

| USER ID | CUMULATIVE TASK SIZE | THRESHOLD | 125 |
|---|---|---|---|
| user1 | 4 DAYS | 7 DAYS | |
| user2 | 8 DAYS | 10 DAYS | |
| ... | ... | ... | |

APPARATUS AND METHOD TO PROVIDE HELP INFORMATION TO A USER IN A TIMELY MANNER

CROSS-REFERENCE TO RELATED APPLICATION

This application is based upon and claims the benefit of priority of the prior Japanese Patent Application No. 2018-116782, filed on Jun. 20, 2018, the entire contents of which are incorporated herein by reference.

FIELD

The embodiments discussed herein are related to apparatus and method to provide help information to a user in a timely manner.

BACKGROUND

As various functions are implemented in software and software is becoming increasingly complex, a user who is unskilled in a particular piece of software may not know about the existence of some functions and may not know how to appropriately use some functions. Therefore, user productivity may be decreased in some cases. In view of such a situation, it is conceivable that a computer actively notify a user of help information that explains functions of the software, without waiting for a request for the help information from the user.

For example, an operation process guidance device that guides a user through the steps of how to operate application software in accordance with the skill level of the user has been proposed. The proposed operation process guidance device detects a user operation applicable to the application software, determines the skill level, searches a database for guidance information corresponding to the determined skill level, and displays the guidance information on an operation screen. For example, a delivery system that monitors viewing of e-books performed by the user and, when the user reaches a predetermined page, displays related information regarding the e-books has also been proposed.

Examples of the related art include Japanese Laid-open Patent Publication No. 2010-218359 and Japanese Laid-open Patent Publication No. 2015-158817.

SUMMARY

According to an aspect of the embodiments, an apparatus stores status information indicating whether each of a plurality of tasks is completed by a user, and workload information indicating a workload of the task. The apparatus detects, based on the status information, completion of a first task, and withholds notification of first help information related to software selected based on a usage state of the software in the first task. The apparatus detects, based on the status information, completion of a second task by the user after completion of the first task, and calculates, based on the workload information, an index value indicating a total workload of a plurality of completed tasks including the first task and the second task. When the index value is greater than a threshold, the apparatus allows providing the user with notification of the first help information and second help information related to the software selected based on a usage state of the software in the second task. When the index value is less than or equal to the threshold, the apparatus withholds notification of the first help information and the second help information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a data structure of a ticket;

FIG. 7 is a diagram illustrating an example of a data structure of a topic table;

FIG. 8 is a diagram illustrating an example of a data structure of a task size table;

DESCRIPTION OF EMBODIMENTS

It is conceivable, as an aspect of project management, to actively provide notification of help information to a user who uses software. However, if a user who performs a series of tasks on a project is frequently notified of help information, the user may feel burdened by the prospect of having to learn the functions of software upon each notification and may instead place a priority on proceeding with the task at hand. Therefore, in some cases, the user ignores help information, and as a result, notification of the help information is ineffective. This raises an issue of the timing of notifying a user of help information.

It is preferable to notify a user of help information in a timely manner.

Hereinafter, the embodiments will be described with reference to the accompanying drawings.

First Embodiment

A first embodiment will be described.

Figure 1:
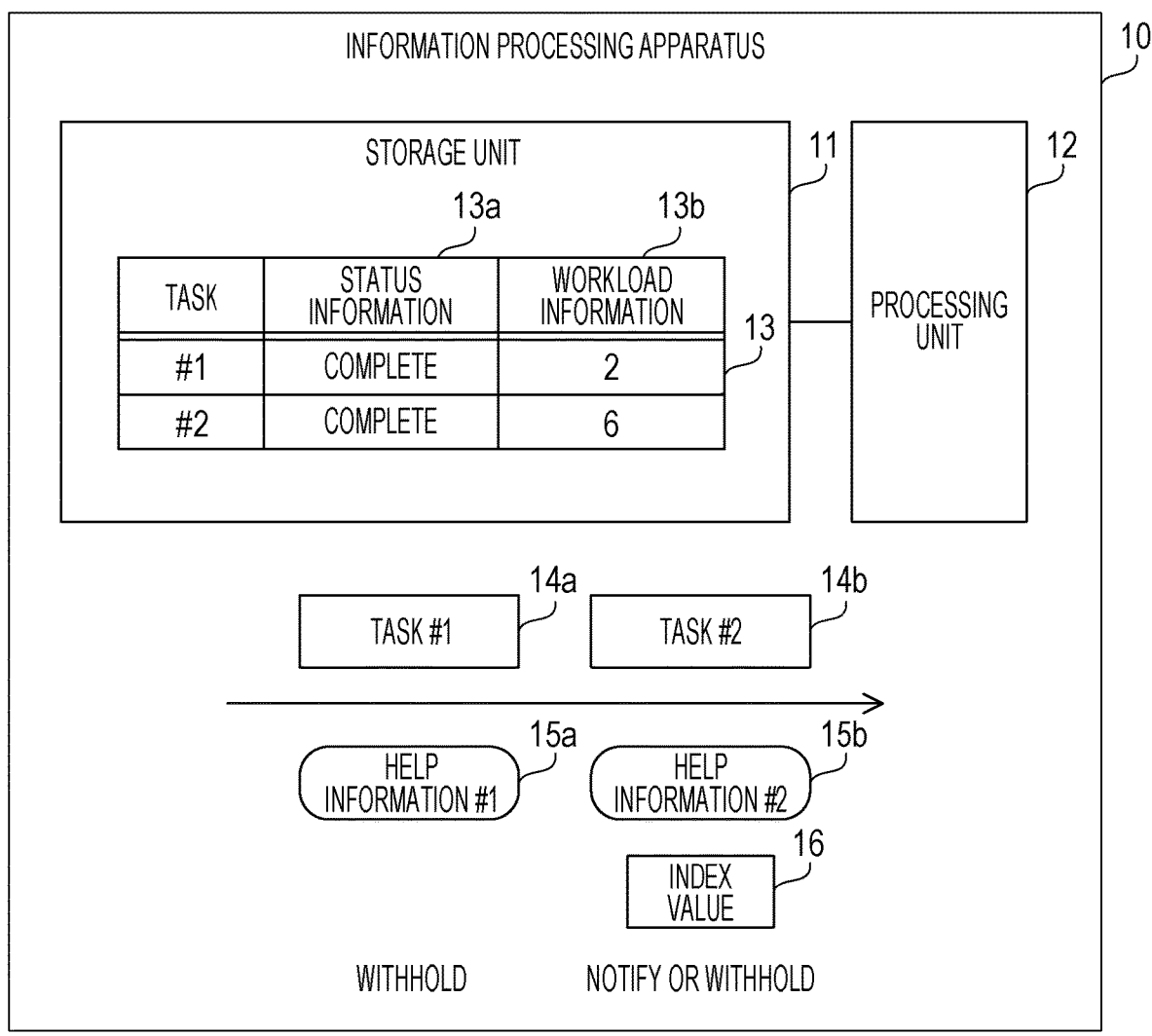
FIG. 1 is a diagram illustrating an example of an information processing apparatus according to an embodiment.

FIG. 1 is a diagram illustrating an example of an information processing apparatus according to the first embodiment.

The information processing apparatus 10 according to the first embodiment automatically provides to a user help information about a method for efficiently using software, in accordance with the state in which software is used by the user. The information processing apparatus 10 is, for example, a project management device that manages business projects. The information processing apparatus 10 may be referred to as a computer. The information processing apparatus 10 may be a client device or a server device.

The information processing apparatus 10 includes a storage unit 11 and a processing unit 12. The storage unit 11 may be a volatile semiconductor memory such as a random access memory (RAM) or may be a nonvolatile storage such as a hard disk drive (HDD) or flash memory. The processing unit 12 is, for example, a processor such as a central processing unit (CPU), micro processing unit (MPU), graphics processing unit (GPU) or digital signal processor (DSP). However, the processing unit 12 may include an application-specific electronic circuit such as an application specific integrated circuit (ASIC) or field programmable gate array (FPGA). The processor executes a program stored in a memory (which may be the storage unit 11) such as a RAM. A project management program is included in the program. A set of a plurality of processors may be referred to as a "multiprocessor" or simply as a "processor".

The storage unit 11 stores therein task management information 13. The task management information 13 includes status information 13a and workload information 13b for each of a plurality of tasks. The status information 13a indicates whether a task is complete. The workload information 13b indicates the workload of a task.

The task represents a chunk of work of a user in a project and, for example, represents programming work such as addition of new functions and bug fixing in software development. Information about one task including the status information 13a and the workload information 13b may be referred to as a ticket, issue, a work instruction, or the like. The workload of a task may be referred to as a task size. As the workload of a task, planned working time for the task, actual working time for the task, permissible time from the start date and time to the deadline for the task, or the like may be used. In addition, as the workload of a task, the size of an input file indicating specifications, the size of an output file, which is a product created by the task, or the like may be used. Examples of the size of an output file include the amount of written program codes. The index of the workload of a task depends on what kind of information is included in the task management information 13.

Based on the status information 13a of the task management information 13, the processing unit 12 detects that a task 14a (first task) among the plurality of tasks is completed. Based on the usage state of software in the task 14a, the processing unit 12 selects help information 15a (first help information) regarding the software. The help information 15a is, for example, selected out of a set of help information prepared in advance.

The software has been used by the user during the task 14a and may be executed by a client device or by a server device. Examples of the software include development tools, library modules, and application programming interfaces (APIs) for supporting creation of programs. The usage state of software may be identified by referencing logs generated by a client device or a server device that has executed the software. The processing unit 12, for example, collects logs from the client device or the server device. The storage unit 11 may store therein logs. The logs, for example, represent the called APIs, dates and times of execution, input data, output data, and the like. For example, a pattern of lines in a log is associated with the help information 15a, and when the pattern is detected in a collected log, the processing unit 12 selects the help information 15a.

The help information 15a is a document including text that describes a method for efficiently using software. The information processing apparatus 10 automatically presents suitable help information to a user without an explicit request from the user. Considering the usage state of software in the task 14a, the help information 15a proposes a method for efficiently using the software to the user. Considering the usage state of software in the task 14a, the help information 15a may represent a function of software thought to be unknown to the user. For example, when a method employed by a user for using an API in the task 14a is inefficient, the help information 15a represents a method that is efficient for using the API and by which equivalent output data is able to be obtained. For example, when an error has occurred upon calling an API in the task 14a, the help information 15a represents one method capable of avoiding the error.

The processing unit 12 does not immediately provide notification of the help information 15a selected for the task 14a but withholds notification of the help information 15a. For example, the processing unit 12 saves the help information 15a or identification information of the help information 15a in a buffer.

Based on the status information 13a of the task management information 13, the processing unit 12 detects that, after completion of the task 14a, a task 14b (second task) among the plurality of tasks is completed. The task 14a and the task 14b are executed by the same user. Another task may be executed between the task 14a and the task 14b by the same user. Then, based on the usage state of software in the task 14b, the processing unit 12 selects help information 15b (second help information) regarding the software. Considering the usage state of software in the task 14b, the help information 15b proposes a method for efficiently use the software to the user.

Based on the workload information 13b, the processing unit 12 calculates an index value 16 representing the total workload of a plurality of complete tasks including the tasks 14a and 14b. The higher the total workload, the greater the index value 16. The plurality of complete tasks are, for example, a set consisting of a complete task associated with the oldest unreported help information and complete tasks executed thereafter by the same user. The index value 16 is, for example, the total amount of planned working time, the total amount of actual working time, and the total amount of permissible time from the start date and time to the deadline, or the like for a plurality of complete tasks. The processing unit 12 compares the index value 16 with a predetermined threshold. The threshold may be stored in the storage unit 11 and may differ from one user to another.

If the index value 16 is greater than the threshold, the processing unit 12 allows notification of the help information 15a and 15b. For example, the processing unit 12 notifies the user of the help information 15a and the help information 15b at a time. If, however, the index value 16 is less than or equal to the threshold, the processing unit 12 continuously withholds notification of the help information 15a and 15b. Examples of a method to provide notification of the help information 15a and 15b are considered to include displaying a pop-up including the help information 15a and 15b on a screen of a terminal device used by the user. Examples of a method to provide notification of the help information 15a and 15b are also considered to include sending an e-mail that includes, as the destination address, an e-mail address of the user and that includes, as the text, the help information 15a and 15b.

With the information processing apparatus 10 according to the first embodiment, notification of help information is inhibited from being frequently provided to the user. This may reduce the possibility of the user placing a priority on proceeding with the task at hand and thus ignoring help information. At a time when the total workload of complete tasks has reached a certain amount, the user is notified at a single time of help information on hold. This leads to the user being notified of help information when the user stops working momentarily, and thus the help information may be provided in a timely manner so the user is able to learn a function of the software. In such a manner, the software user may be notified in a timely manner of help information, which helps the user to utilize the help information. This may result in supporting the user in learning of software, resulting in efficient use of the software.

Second Embodiment

A second embodiment will now be described.

Figure 2:
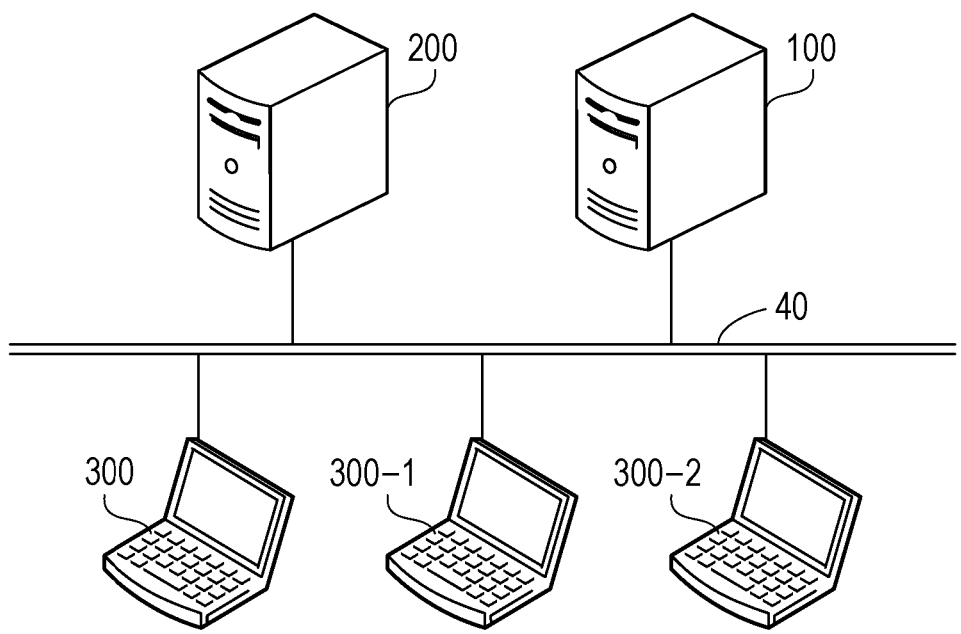
FIG. 2 is a diagram illustrating an example of an information processing system according to an embodiment.

FIG. 2 is a diagram illustrating an example of an information processing system according to the second embodiment.

The information processing system according to the second embodiment includes a project management server 100, an application server 200, and clients 300, 300-1, and 300-2. The devices mentioned above are coupled to a network 40. The project management server 100 corresponds to the information processing apparatus 10 according to the first embodiment.

The project management server 100 is a server computer that manages the progress of projects. The project management server 100 holds information about a plurality of tasks belonging to a project. The project management server 100 receives access from the clients 300, 300-1, and 300-2 via the network 40 and updates information about tasks. The project management server 100 provides the latest information about tasks via the network 40 to the clients 300, 300-1, and 300-2.

For communication between the project management server 100 and the clients 300, 300-1, and 300-2, for example, a hypertext transfer protocol (HTTP) is used. Screen information written in a markup language such as hypertext markup language (HTML), for example, is provided from the project management server 100 to the clients 300, 300-1, and 300-2. For the purpose of providing information to the clients 300, 300-1, and 300-2, the project management server 100 collects logs representing a history of execution of software in the application server 200 from the application server 200. The project management server 100 may collect logs representing histories of execution of software in the clients 300, 300-1, and 300-2.

The application server 200 is a server computer that executes software that is used in a project. A plurality of types of software are installed in the application server 200. For example, the application server 200 provides an API for the clients 300, 300-1, and 300-2. Examples of the software that is installed in the application server 200 include programming support tools, and libraries, middleware, and the like that are called from a user program.

The application server 200 receives request messages including input data via the network 40 from the clients 300, 300-1, and 300-2 and executes software based on the received request messages. The application server 200 sends a response message including output data that is an execution result of the software via the network 40 to the clients 300, 300-1, and 300-2. The application server 200 also records a log representing a history of execution of software and provides the log to the project management server 100.

Software that is installed in the application server 200 is large in scale and versatile in some cases, and it takes time for the user to master the software in some cases. Thus, the user does not necessarily know all the functions of the software and sometimes use the software in an inefficient manner. Therefore, the project management server 100 supports the user in learning the functions of software as part of project management. Based on a log collected from the application server 200, the project management server 100 detects inefficient use of software by some user and transmits help information for promoting efficient use of the software to the user.

The clients 300, 300-1, and 300-2 are client computers used by users who participate in a project. The clients 300, 300-1, and 300-2 register information about tasks belonging to the project in the project management server 100. The clients 300, 300-1, and 300-2 also receive the latest information about tasks belonging to the project from the project management server 100 and displays the information on a display. In such a way, the clients 300, 300-1, and 300-2 share information about tasks. The clients 300, 300-1, and 300-2 also receive, from the project management server 100, help information that presents a method for efficiently using the software and displays the help information on a display.

The clients 300, 300-1, and 300-2 use the application server 200 for executing tasks. The clients 300, 300-1, and 300-2 send a request message including input data to the application server 200 and receive a response message including output data from the application server 200.

The clients 300, 300-1, and 300-2 may execute a user program being created. The clients 300, 300-1, and 300-2 may execute software such as a programming support tool. In this case, the clients 300, 300-1, and 300-2 may record logs, which represent histories of execution of software, and may provide the logs to the project management server 100.

Figure 3:
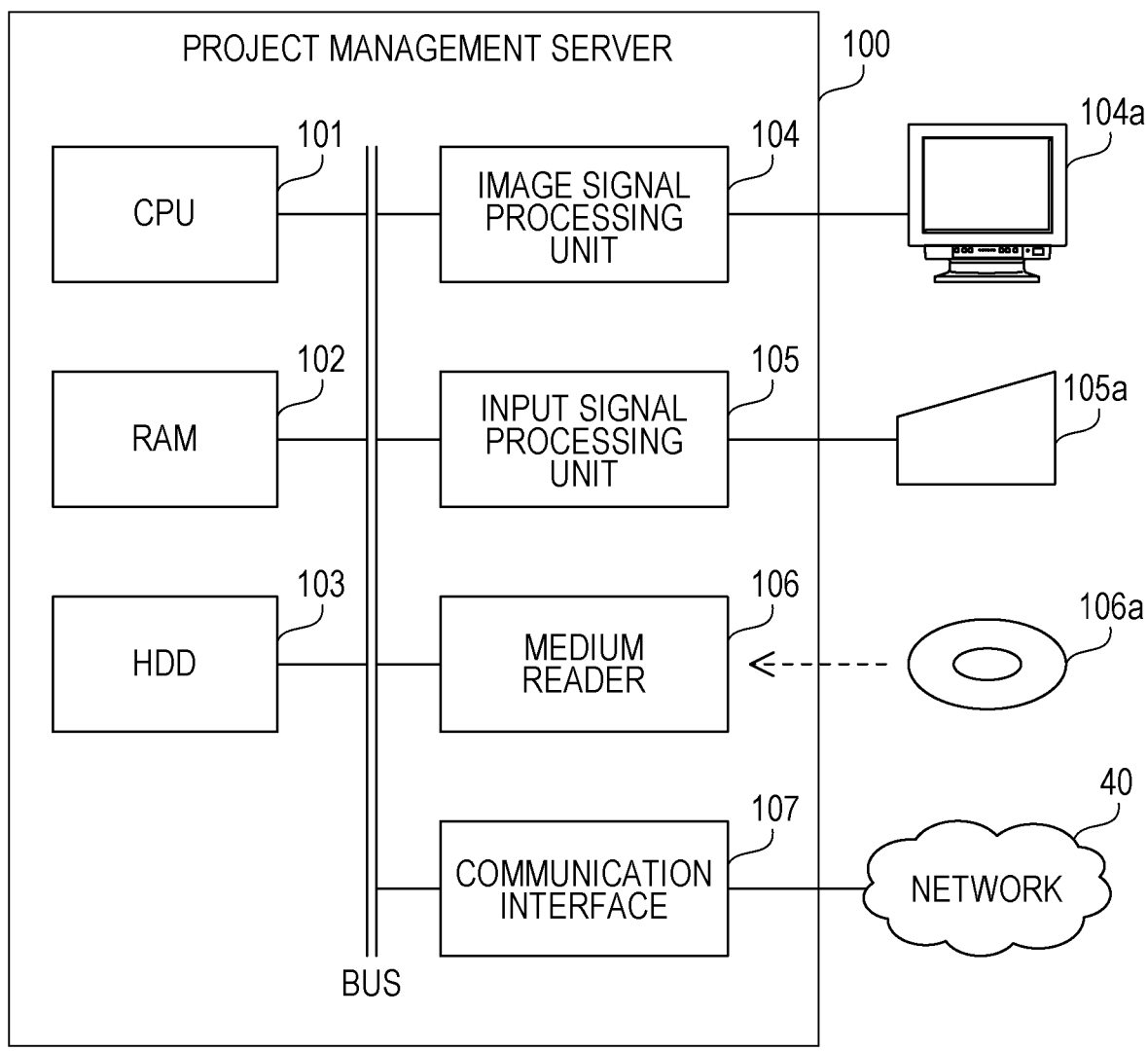
FIG. 3 is a block diagram illustrating an example of hardware of a project management server.

FIG. 3 is a block diagram illustrating an example of hardware of a project management server.

The project management server 100 includes a central processing unit (CPU) 101, a random access memory (RAM) 102, a hard disk drive (HDD) 103, an image signal processing unit 104, an input signal processing unit 105, a medium reader 106, and a communication interface 107. The units mentioned above are coupled to a bus.

The CPU 101 corresponds to the processing unit 12 according to the first embodiment. The RAM 102 or the HDD 103 corresponds to the storage unit 11 according to the first embodiment. The application server 200 and the clients 300, 300-1, and 300-2 may be implemented by using hardware similar to the hardware of the project management server 100.

The CPU 101 is a processor that executes instructions of a program. The CPU 101 loads, in the RAM 102, at least some of the programs and data stored in the HDD 103 and executes the programs. The CPU 101 may include a plurality of processor cores and the project management server 100 may include a plurality of processors. A set of a plurality of processors may be referred to as a "multiprocessor" or simply as a "processor".

The RAM 102 is a volatile semiconductor memory that temporarily stores a program for execution by the CPU 101 and data used for operations by the CPU 101. The project management server 100 may include memories of types other than a RAM or may include a plurality of memories.

The HDD 103 is a nonvolatile storage device for storing programs of software such as an operating system (OS), middleware, and application software and data. The project management server 100 may include another type of storage device such as a flash memory or solid state drive (SSD) and may include a plurality of storage devices.

The image signal processing unit 104 follows an instruction from the CPU 101 to output an image to a display 104a coupled to the project management server 100. As the display 104a, any type of display such as a cathode ray tube (CRT) display, liquid crystal display (LCD), or organic electro-luminescence (OEL) display may be used.

The input signal receiving unit 105 receives an input signal from the input device 105a coupled to the project management server 100. As the input device 105a, any type of input device such as a mouse, touch panel, or keyboard may be used. A plurality of types of input devices may be coupled to the project management server 100.

The medium reader 106 is a reading device that reads programs and data recorded on a recording medium 106a. As the recording medium 106a, for example, a magnetic disk such as a flexible disk (FD) or HDD, an optical disk such as a compact disc (CD) or digital versatile disc (DVD), a magneto-optical disk (MO), a semiconductor memory, or the like may be used. The medium reader 106, for example, stores programs and data read from the recording medium 106a in the RAM 102 or the HDD 103.

The communication interface 107 is an interface that is coupled to the network 40 and that communicates via the network 40 with the application server 200 and the clients 300, 300-1, and 300-2. The communication interface 107 may be a wired communication interface connected to a wired communication device such as a switch or router or may be a wireless communication interface coupled to a base station or an access point.

Project management performed by the project management server 100 will now be described.

FIG. 4 is a diagram illustrating an example of a data structure of a ticket.

The project management server 100 holds, as one ticket, information about one task belonging to a project. The ticket may be referred to as issue or a work instruction. The project management server 100 creates and updates tickets in response to requests from the clients 300, 300-1, and 300-2. The project management server 100 also provides tickets in response to requests from the clients 300, 300-1, and 300-2.

A ticket 121, an example of the ticket, includes such items as the ticket ID, title, person in charge, explanation, planned man-hours, deadline, beginning date and time, ending date and time, status, and comment.

The ticket ID is an identifier that identifies a ticket. The title is a string that straightforwardly expresses a task. The person in charge is a user who executes a task and who is identified by a user ID that identifies the user. Two or more persons in charge are assigned to one ticket in some cases. The explanation is a string that explains specifics of a task. Examples of the task include adding a new function to a program being developed and correcting a defect in an existing program. Examples of the specifics of a task include recognizing handwritten characters by using specific software executed by the application server 200.

The planned man-hours are estimated working time for a task, which is estimated at the time of creation of the ticket 121. The deadline is a planned ending date and time set at the time of creation of the ticket 121. The beginning date and time is the date and time when a task actually began. The ending date and time is the date and time when a task actually ended. The status is a flag indicating the current state of a task and, for example, indicates that the task is pending or the task has been completed (closed). Completion of a task may be referred to as closing. The comment is a string representing the content discussed by the users concerned during execution of a task.

The ticket 121 may not include all of the planned man-hours, the deadline, the beginning date and time, and the ending date and time. For example, in some cases, the ticket 121 includes the beginning date and time and the ending date and time but does not include the planned man-hours and the deadline. In some cases, the ticket 121 includes the planned man-hours but does not include the deadline, the beginning date and time, and the ending date and time. In some cases, the ticket 121 includes the beginning date and time and the deadline but does not include the planned man-hours and the ending date and time. The ticket 121 is sufficient if the time taken for the user to execute the task is able to be roughly estimated from the ticket 121.

Figure 5:
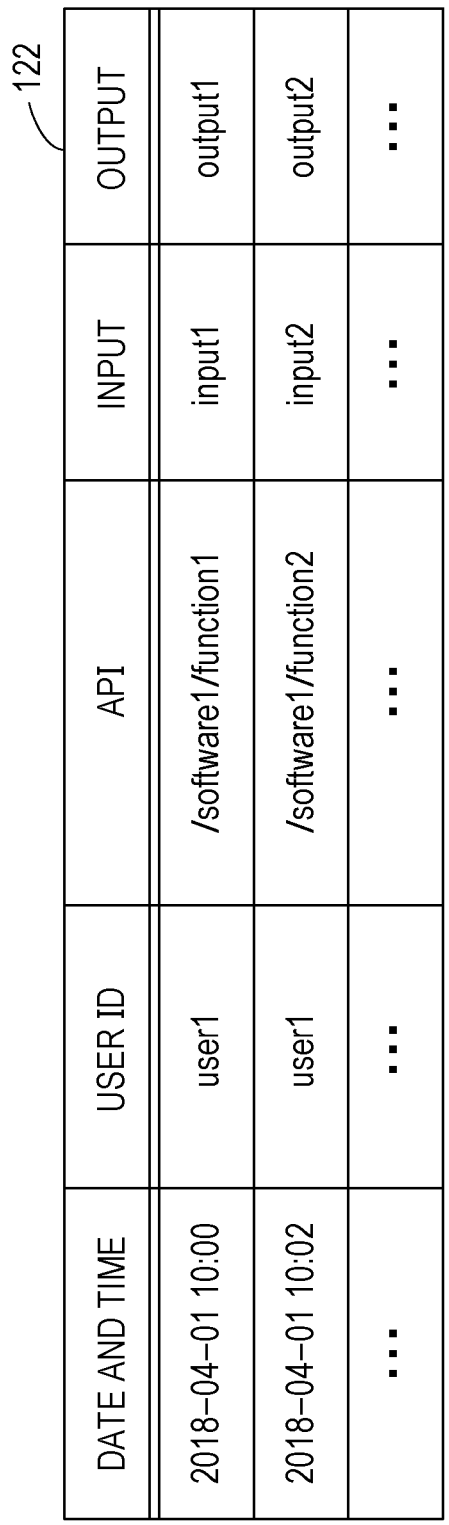
FIG. 5 is a diagram illustrating an example of a data structure of a log table.

FIG. 5 is a diagram illustrating an example of a data structure of a log table.

The application server 200 generates a log table 122. The project management server 100 receives the log table 122 from the application server 200. The clients 300, 300-1, and 300-2 may create a log table similar to the log table 122 to provide the log table to the project management server 100.

The log table 122 includes such items as the date and time, user ID, API, input, and output. The date and time is the date and time when an API was called. The user ID is an identifier that identifies a user who called an API. The API is an software interface that identifies the function of software to be executed. The API includes a software name and a function name in some cases. The API may be identified by a uniform resource locator (URL). The input is input data input to the application server 200 upon calling an API. The output data is output data output from the application server 200 for calling an API. The output is an error message such as exception in some cases.

Figure 6:
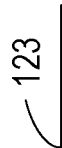
FIG. 6 is a diagram illustrating an example of a data structure of a help information table.

FIG. 6 is a diagram illustrating an example of a data structure of a help information table.

The project management server 100 holds a help information table 123. In the help information table 123, a plurality of pieces of help information are registered in advance. The project management server 100 selects suitable information from the help information table 123 based on the log table 122 and notifies a user of the selected help information.

The help information table 123 includes such items as the software name, help ID, detection pattern, and help information. The software name is the name of software installed in the application server 200. For example, the software name is the tool name of a program development tool, the library name, or the like. The help ID is an identifier that identifies help information. The detection pattern is a pattern of execution histories to be detected from the log table 122. The detection pattern indicates inefficient use of software.

Examples of the detection pattern include a pattern in which a plurality of specific functions are sequentially called. When a single function capable of outputting the same output data is prepared, a user may be using the software in a roundabout way because the user does not know about the single function. Examples of the detection pattern also include a pattern in which input data of a specific data structure is used. In the case where the function that is able to efficiently output the same output data is able to be used if the data structure of input data is changed, a user may be using an inefficient function because the user does not recognize the possibility of using the function. Examples of the detection pattern also include a pattern in which a specific type of exception has occurred by function calling. A method to create input data for avoiding the exception or a method to write a suitable user program to deal with the exception may be unknown to the user.

The help information is information that supports a user to deal with inefficient use of software indicated by a detection pattern so that the user is able to efficiently use the software. The help information may be referred to as additional information, related information, or the like. The help information includes text describing the functions of software. Some pieces of help information for detection patterns may describe functions that may be unknown to the user. For example, help information describes a function that may be unknown to the user. For example, help information describes a desirable data structure of input data. For example, help information describes suitable handling for exception that has occurred.

FIG. 7 is a diagram illustrating an example of a data structure of a topic table.

When concurrently notifying the same user of a plurality of pieces of help information, the project management server 100 classifies the plurality of pieces of help information into topics in order to facilitate the user's understanding. The topic may be referred to as a type, group, class, of the like of help information. The topic is determined based on text included in a ticket.

Upon detecting closing of some ticket, the project management server 100 extracts logs regarding the closed ticket from the log table 122. The logs regarding the closed ticket are an execution history of software executed in the task indicated by the ticket. A log to be extracted is a log that includes the user ID of a person in charge in the ticket and whose date and time belongs to a period from the beginning of the task to the ending. The project management server 100 searches the extracted logs for detection patterns registered in the help information table 123. If there is a log that matches any detection pattern, the project management server 100 selects, as help information of which notification is to be provided, help information corresponding to the matched detection pattern.

The project management server 100 determines a topic of help information of which notification is to be provided, based on text of the title, explanation, comment, and the like of the closed ticket. From a keyword included in the text, the topic of help information is determined.

The project management server 100 holds the topic table 124. A plurality of topics are registered in advance in the topic table 124. From the topic table 124 and text included in the closed ticket, a topic of help information is determined.

The topic table 124 includes such items as the topic ID, topic name, and keyword. The topic ID is an identifier that identifies a topic. The topic name is a string that is easily understandable by the user and that straightforwardly describes a topic. The topic name is used when the user is notified of help information. The keyword is a word that is used for text of the title, explanation, comment, and the like of the ticket. One or more keywords with a high degree of association are associated with one topic.

The project management server 100 searches for a keyword from a closed ticket and selects, from among topics described in the topic table 124, a topic that best matches the keyword. For example, the project management server 100 counts the number of appearances of the keyword for each topic and selects a topic for which the number of appearances of the keyword is greatest. The project management server 100 classifies help information generated from the ticket into the selected topic.

The project management server 100 provides notification of help information to a user who is a person in change described on the ticket. One notification method may be to send help information to the client so that the help information is displayed as a pop-up on the screen when a client used by the user has made access to the project management server 100. Another notification method may be to send an e-mail that includes, as the destination address, an e-mail address of the user and that includes, as the text, the help information.

At this point, the project management server 100 controls a timing of notifying the user of help information. Providing notification of help information each time a ticket is closed allows the user to frequently receive notification of help information when the user continuously executes a plurality of small tasks. In such a case, the user may feel burdened when the user is notified of help information, and may place a priority on proceeding with the task at hand to ignore the help information. As a result, there is a possibility that the user will not learn a method for efficiently using software based on the help information. If too much time has passed since the user used some software, the motivation of the user to learn a method for efficiently using software is likely to decrease.

Therefore, it is desirable to notify a user of help information when the user has performed a certain amount of working and stops working momentarily. This may reduce the possibility of the user ignoring help information, and thus notification of help information may be contributed to efficient use of software. Therefore, the project management serve 100 counts the cumulative task size for each user and notifies the user of help information at a time when the cumulative task size has exceeded the threshold.

FIG. 8 is a diagram illustrating an example of a data structure of a task size table.

The project management server 100 holds a task size table 125. The task size table 125 includes such items as the user ID, cumulative task size, and threshold. The user ID is an identifier that identifies a user. The cumulative task size is a total of sizes of tasks that are closed in a period during which unreported help information is accumulated. The threshold is a threshold of a cumulative task size set by the user. When the cumulative task size has exceeded the threshold, the project management server 100 notifies the user of accumulated help information at a single time.

The task size is an index indicating the workload of a user and is calculated from a closed ticket. When the beginning date and time and the ending date and time are described on the ticket, it is desirable to use, as the task size, an actual working time, which is a difference between the beginning date and time and the ending date and time. If the actual working time is unable to be calculated, planned man-hours may be used as a task size. As the task size, permissible time, which is a difference between the beginning date and time and the deadline, may be used. As the task size, the data size of a product such as the amount of program codes may be used instead of the working time.

When some ticket is closed, the project management server 100 calculates the task size of the ticket. The project management server 100 compares the threshold of the user described on the ticket with the task size and withholds notification of help information generated from the ticket if the task size is less than or equal to the threshold. Upon beginning withholding notification of help information, the project management server 100 stores the task size as the cumulative task size of the user. Each time the ticket on which the user is described is closed, the project management server 100 adds the task size of the closed ticket to the cumulative task size and waits until the cumulative task size of the user exceeds the threshold. When the cumulative task size exceeds the threshold, the project management server 100 notifies the user of help information on hold at a single time. At this point, to facilitate understanding, help information is classified into topics. Upon providing notification of help information, the project management server 100 resets the cumulative task size to zero.

When a ticket with a large task is closed, notification of help information generated from the ticket is not withheld but is immediately provided to the user. In contrast, when a ticket with a small task is closed, notification of help information generated from the ticket is withheld and is not immediately provided to the user. When the task of the closed ticket has reached a certain amount, notification of help information is provided.

Figure 9:
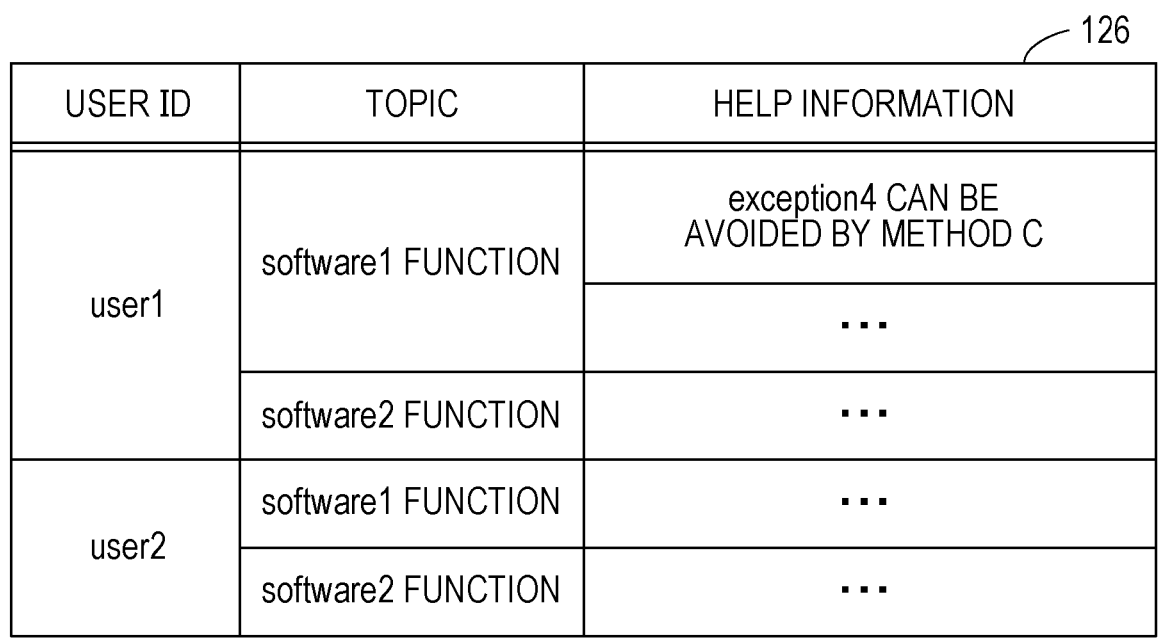
FIG. 9 is a diagram illustrating an example of a data structure of a notification buffer.

FIG. 9 is a diagram illustrating an example of a data structure of a notification buffer.

The project management server 100 holds a notification buffer 126. The notification buffer 126 includes such items as the user ID, topic, and help information. The user ID is an identifier that identifies a user. The topic is any topic described in the topic table 124 and is determined from text of a closed ticket. The help information is help information on hold. In the notification buffer 126, help information on hold is registered such that the help information is classified by user and by topic. In the notification buffer 126, topic IDs may be registered or topic names may be registered. In the notification buffer 126, help information itself may be registered or help IDs may be registered.

Figure 10:
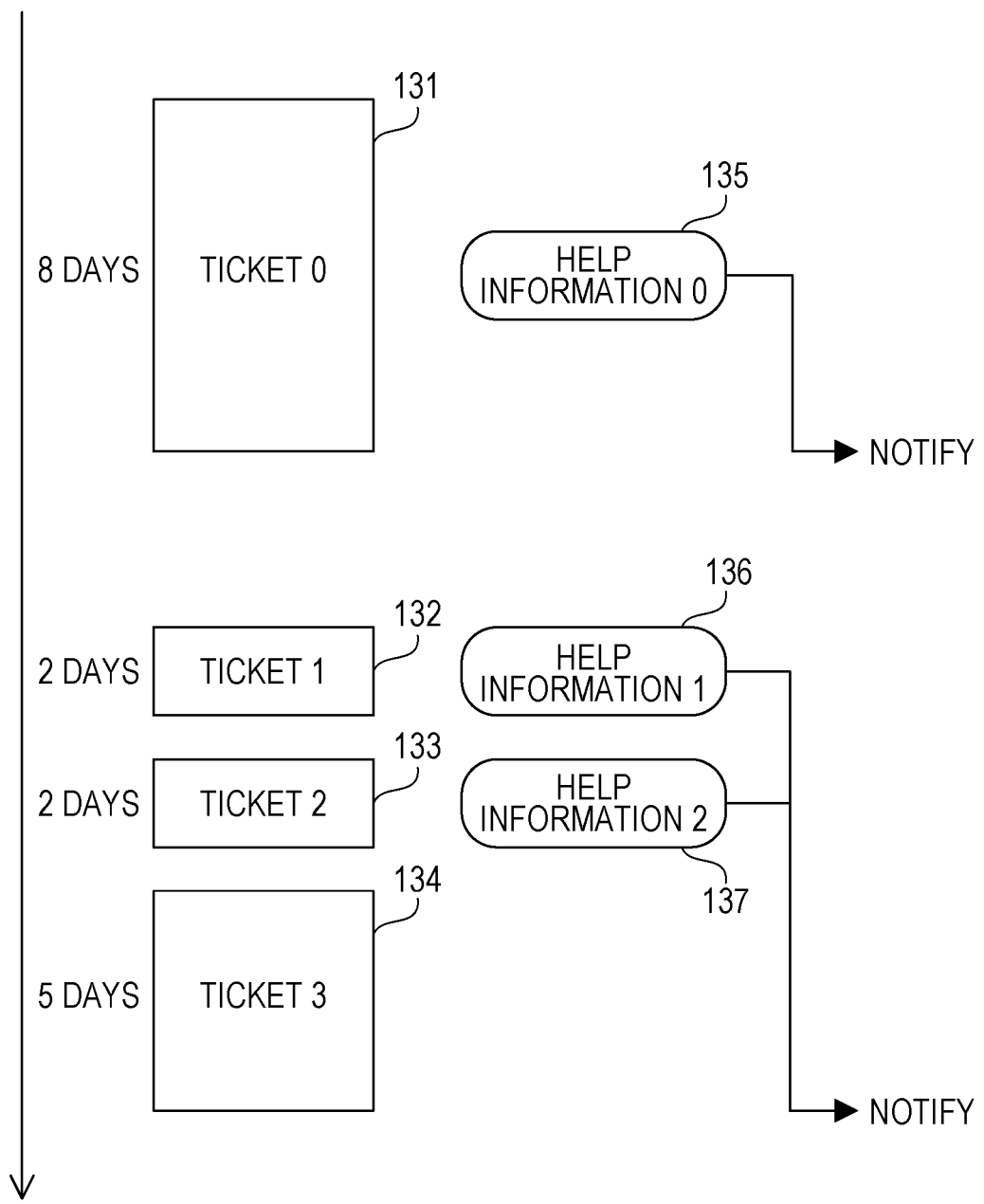
FIG. 10 is a diagram illustrating an example of timing of notification of help information.

FIG. 10 is a diagram illustrating an example of timing of notification of help information.

It is considered that the same user sequentially execute tasks of tickets 131 to 134. The user starts the task of the ticket 132 after the task of the ticket 131 is completed, starts the task of the ticket 133 after the task of the ticket 132 is completed, and starts the task of the ticket 134 after the task of the ticket 133 is completed. It is assumed that the task size of the ticket 131 is eight days, the task size of the ticket 132 is two days, the task size of the ticket 133 is two days, and the task size of the ticket 134 is five days. The threshold set by the user is assumed as seven days. Help information 135 is generated from the ticket 131, help information 136 is generated from the ticket 132, and help information 137 is generated from the ticket 133. Help information is not generated from the ticket 134.

If the ticket 131 is closed, the task size of the ticket 131 is greater than the threshold and therefore notification of the help information 135 is not withheld but is immediately provided to the user. In contrast, if the ticket 132 is closed, the task size of the ticket 132 is less than or equal to the threshold and therefore notification of the help information 136 is withheld and is not provided to the user. If the ticket 133 is closed, the cumulative task size of the tickets 132 and 133 is less than or equal to the threshold and therefore notification of the help information 136 and 137 is withheld and is not provided to the user. If the ticket 134 is closed, the cumulative task size of the tickets 132 to 134 is greater than the threshold and therefore the user is notified at a single time of the help information 136 and 137 on hold.

Figure 11:
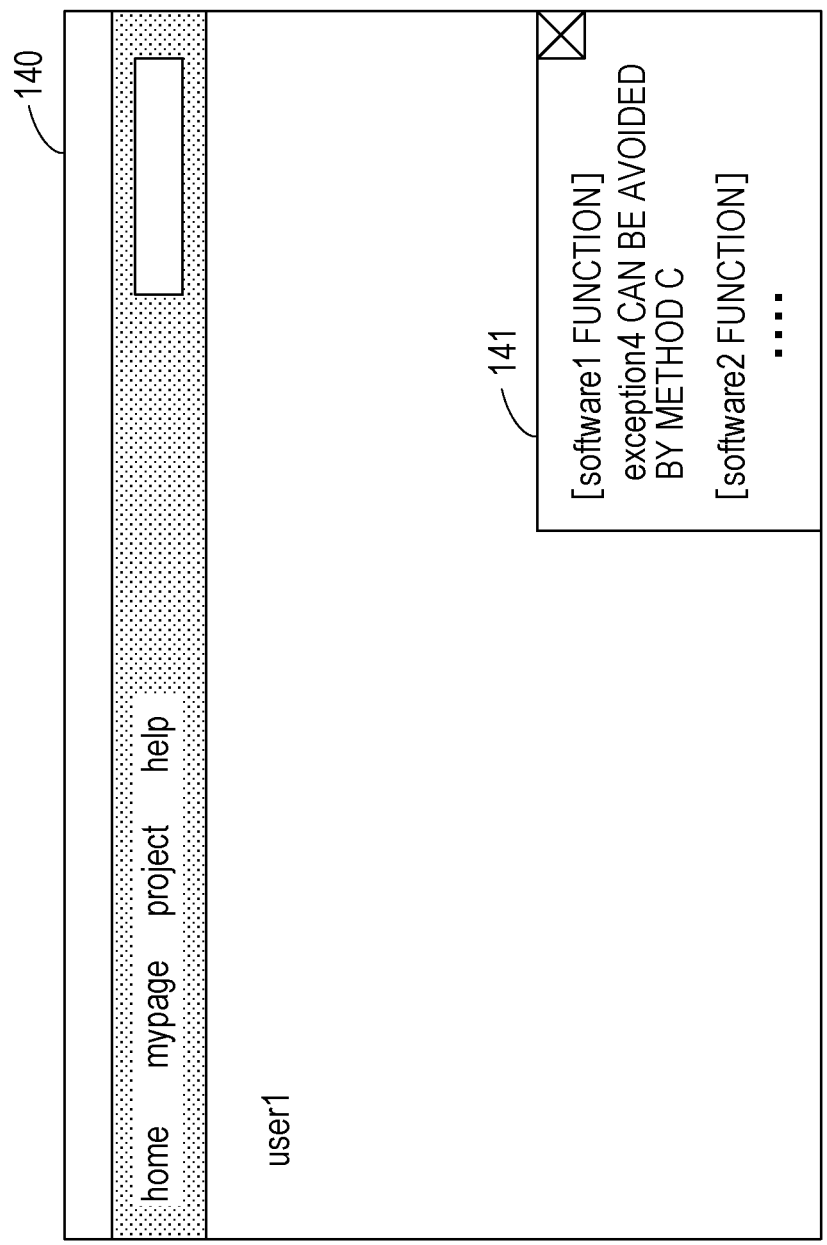
FIG. 11 is a diagram illustrating an example of a project management screen.

FIG. 11 is a diagram illustrating an example of a project management screen.

The project management server 100 may notify the user of help information as a pop-up on a screen. A project management screen 140 is an example of a screen displayed for the client 300 based on screen information sent from the project management server 100 to the client 300. The project management screen 140 includes a pop-up area 141.

In the pop-up area 141, topic names and text of help information are displayed. In the pop-up area 141, a plurality of pieces of help information are sorted according to topics. For example, a topic name "software1 function" is described and text of help information regarding a function of software1 is described under the topic name, and a topic name "software2 function" is described and text of help information regarding a function of software2 is described under the topic name. Information in the pop-up area 141 may be sent as an e-mail.

The functions of the project management server 100 will now be described.

Figure 12:
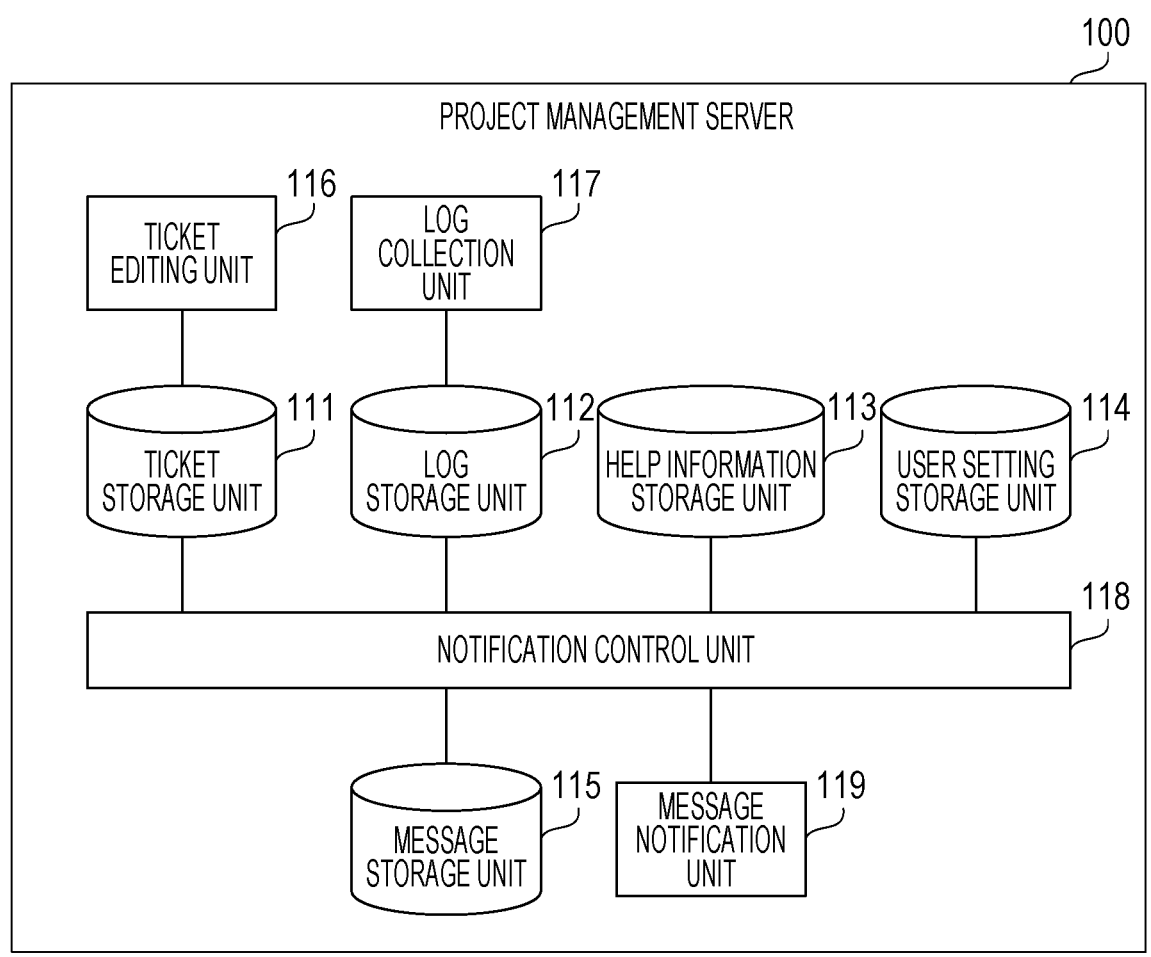
FIG. 12 is a block diagram illustrating an example of functions of a project management server.

FIG. 12 is a block diagram illustrating an example of functions of a project management server.

The project management server 100 includes a ticket storage unit 111, a log storage unit 112, a help information storage unit 113, a user setting storage unit 114, a message storage unit 115, a ticket editing unit 116, a log collection unit 117, a notification control unit 118, and a message notification unit 119. The ticket storage unit 111, the log storage unit 112, the help information storage unit 113, the user setting storage unit 114, and the message storage unit 115 are implemented by using a storage area of the RAM 102 or the HDD 103. The ticket editing unit 116, the log collection unit 117, the notification control unit 118, and the message notification unit 119 are implemented by using programs executed by the CPU 101.

The ticket storage unit 111 stores a plurality of tickets. The log storage unit 112 stores the log table 122. The help information storage unit 113 stores the help information 123 and the topic table 124. The user setting storage unit 114 stores the task size table 125. The message storage unit 115 holds the notification buffer 126.

The ticket editing unit 116 generates new tickets in response to access from the clients 300, 300-1, and 300-2 and stores the generated tickets in the ticket storage unit 111. In response to access from the clients 300, 300-1, and 300-2, the ticket editing unit 116 also updates tickets stored in the ticket storage unit 111.

The log collection unit 117 collects logs from the application server 200 and records logs in the log table 122. For example, the log collection unit 117 sends a log request to the application server 200 and receives logs from the application server 200. The log collection unit 117 may regularly collect logs from the application server 200. When a ticket is closed, the log collection unit 117 may also collect logs regarding the closed ticket from the application server 200. The log collection unit 117 may collect logs from the clients 300, 300-1, and 300-2 regarding software executed by the clients 300, 300-1, and 300-2.

The notification control unit 118 monitors tickets stored in the ticket storage unit 111 and detects a closed ticket. The notification control unit 118 searches the log table 122 for logs regarding the closed ticket and determines whether any detection pattern described in the help information table 123 is included in the logs. The logs regarding the closed ticket are a history of execution of software, which is executed by the user described on the ticket, in a time period from the beginning of the ticket to the closing. If any detection pattern is included in the logs, the notification control unit 118 selects help information corresponding to the detection pattern.

When the help information is selected, the notification control unit 118 searches text of the ticket for a keyword or keywords registered in the topic table 124 and classifies the help information into a topic for which the number of keywords is greatest. The notification control unit 118 calculates the task size from the ticket and compares the cumulative task size of the user described on the ticket with the threshold. If the cumulative task size is greater than the threshold, the notification control unit 118 allows notification of help information addressed to the user. If the cumulative task size is less than or equal to the threshold, the notification control unit 118 withholds notification of help information addressed to the user.

The message notification unit 119 notifies the user of help information allowed by the notification control unit 118. For example, upon receiving access from the client 300, the message notification unit 119 sends to the client 300 screen information including help information addressed to a user who uses the client 300. For example, the message notification unit 119 also sends an e-mail including the help information to the user. When providing notification of a plurality of pieces of help information at a single time, the message notification unit 119 sorts the help information according to topics.

Figure 13:
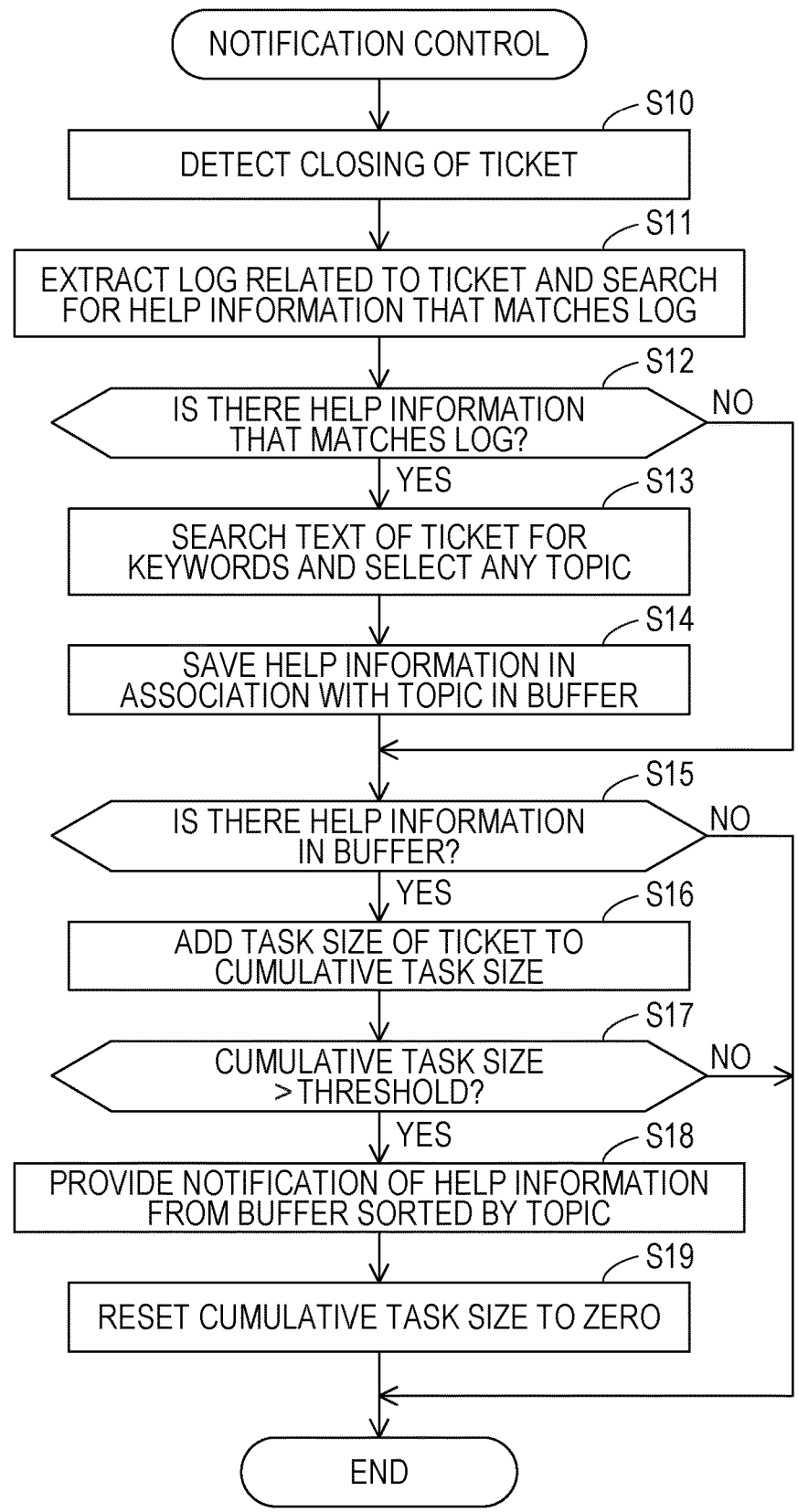
FIG. 13 is a flowchart illustrating an example of a process of notification control.

FIG. 13 is a flowchart illustrating an example of a process of notification control.

(S10) The notification control unit 118 detects closing of a ticket.

(S11) The notification control unit 118 extracts logs regarding the ticket in step S10 from the log table 122. The notification control unit 118 compares the extracted logs with detection patterns in the help information table 123 and searches for help information that matches any detection pattern.

(S12) The notification control unit 118 determines whether help information that matches a detection pattern is found in step S11. In step S11, help information that matches a detection pattern is not found in some cases, and two or more pieces help information are found in other cases. If there is help information that matches a detection pattern, the process proceeds to step S13; whereas if there is no help information that matches a detection pattern, the process proceeds to step S15.

(S13) The notification control unit 118 searches text of the ticket in step S10 for keywords in the topic table 124. Based on the number of keywords found from the search, the notification control unit 118 selects any topic from the topic table 124.

(S14) The notification control unit 118 registers, in the notification buffer 126, help information in association with the user described in the ticket in step S10 and with the topic in step S13.

(S15) The notification control unit 118 determines whether help information for the user described in the ticket in step S10 is registered in the notification buffer 126. The registered help information is help information selected by using the current ticket, in some cases, and is help information that is selected by using a past ticket and that is withheld, in other cases. If the corresponding help information is present, the process proceeds to step S16; whereas if the corresponding help information is absent, the notification control terminates.

(S16) The notification control unit 118 calculates a task size from the ticket in step S10. The notification control unit 118 adds the calculated task size to the cumulative task size in the task size table 125 for the user described in the ticket in step S10.

(S17) The notification control unit 118 compares the cumulative task size in the task size table 125 for the user described in the ticket in step S10 and a threshold. If the cumulative task size is greater than the threshold, the process proceeds to step S18; whereas if the cumulative task size is less than or equal to the threshold, notification control for the current ticket terminates.

(S18) The notification control unit 118 extracts, from the notification buffer 126, unreported help information for the user described in the ticket in step S10. The message notification unit 119 sorts the extracted information by topic and notifies the user of the help information in such a manner. For example, the message notification unit 119 displays a topic name and text of help information in a pop-up area. For example, the message notification unit 119 also sends an e-mail including a topic name and text of help information in such a manner as to designate the e-mail address of the user.

(S19) The notification control unit 118 resets, to zero, the cumulative task size in the task size table 125 for the user described in the ticket in step S10.

With the information processing system according to the second embodiment, upon closing of a ticket, inefficient use of software by the user is detected from logs representing a history of execution of the software. Then, the user is automatically notified of help information that describes functions of the software and how to use the software. Thus, the efficiency in the user's execution of tasks in the future increases.

Notification of help information is provided at a time when a cumulative task size has exceeded a threshold, and the notification is withheld while the cumulative task size is less than or equal to the threshold. This may reduce the possibility of the user feeling burdened by frequent notification of help information and thus ignoring the help information. There are many cases where the time at which the cumulative task size has exceeded a threshold is a time at which the user stops working momentarily. Such cases are suitable for learning functions of software used immediately before stopping, and therefore the learning of the user is promoted. When notification of a plurality of pieces of help information is provided at a single time, the plurality of pieces of information are automatically classified into topics and are displayed in a sorted manner according to topics. Therefore, the user's understanding of help information may be facilitated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory configured to store task management information including status information indicating whether each of a plurality of tasks is completed by a user, and workload information indicating a workload predefined for the task; and a processor coupled to the memory and configured to:
  detect, based on the status information, completion of a first task by the user,
  withhold first notification of first help information related to software selected based on a usage state of the software in the first task,
  detect, based on the status information, completion of a second task by the user after completion of the first task,
  calculate, based on the workload information, an index value indicating a total workload of a plurality of completed tasks including the first task and the second task,
  when the index value is greater than a threshold, provide the user with the first notification along with a second notification of second help information related to the software selected based on a usage state of the software in the second task, and
  when the index value is less than or equal to the threshold, withhold the first notification and the second notification.

2. The information processing apparatus of claim 1, wherein the index value is a total amount of actual working times for the plurality of completed tasks, a total amount of planned working times for the plurality of completed tasks, or a total amount of permissible times each indicating a time from a beginning of a task to a deadline of the task for the plurality of completed tasks.

3. The information processing apparatus of claim 1, wherein the plurality of completed tasks includes the first task completed by the user and tasks that are completed by the user during a time period in which notification of the first help information is withheld.

4. The information processing apparatus of claim 1, wherein:
  the task management information includes text information for each of the plurality of tasks; and
  the processor is further configured to:
    determine, based on a word included in the text information, a category of each of the first help information and the second help information, and
    when providing the user with the first notification along with the second notification, control, based on the category, a display order of the first help information and the second help information.

5. A project management method performed by a processor included in an information processing apparatus, the project management method comprising:
  providing task management information including status information indicating whether each of a plurality of tasks is completed by a user, and workload information indicating a workload predefined for the task;
  detecting, based on the status information, completion of a first task by the user;
  withholding first notification of first help information related to software selected based on a usage state of the software in the first task;
  detecting, based on the status information, completion of a second task by the user after completion of the first task;
  calculating, based on the workload information, an index value indicating a total workload of a plurality of completed tasks including the first task and the second task;
  when the index value is greater than a threshold, providing the user with the first notification along with a second notification of second help information related to the software selected based on a usage state of the software in the second task; and
  when the index value is less than or equal to the threshold, withholding the first notification and the second notification.

6. A non-transitory, computer-readable recording medium having stored therein a program for causing a computer to execute a process comprising:
  providing task management information including status information indicating whether each of a plurality of tasks is completed by a user, and workload information indicating a workload predefined for the task;
  detecting, based on the status information, completion of a first task by the user;
  withholding first notification of first help information related to software selected based on a usage state of the software in the first task;
  detecting, based on the status information, completion of a second task by the user after completion of the first task;
  calculating, based on the workload information, an index value indicating a total workload of a plurality of completed tasks including the first task and the second task;
  when the index value is greater than a threshold, providing the user with first notification along with a second notification of second help information related to the software selected based on a usage state of the software in the second task; and
  when the index value is less than or equal to the threshold, withholding the first notification and the second notification.

* * * * *